United States Patent [19]

Pedotti et al.

[11] Patent Number: 4,706,296
[45] Date of Patent: Nov. 10, 1987

[54] MODULARLY EXPANSIBLE SYSTEM FOR REAL TIME PROCESSING OF A TV DISPLAY, USEFUL IN PARTICULAR FOR THE ACQUISITION OF COORDINATES OF KNOWN SHAPE OBJECTS

[75] Inventors: Antonio Pedotti, Brenta; Giancarlo Ferrigno, Milan, both of Italy

[73] Assignee: Fondazione Pro Juventute Don Carlo Gnocchi, Milan, Italy

[21] Appl. No.: 615,442

[22] Filed: May 30, 1984

[30] Foreign Application Priority Data

Jun. 3, 1983 [IT] Italy ................... 21458 A/83
Nov. 15, 1983 [IT] Italy ................... 23733 A/83

[51] Int. Cl.$^4$ .................. G06K 9/62; G06F 15/336
[52] U.S. Cl. .................................. 382/42; 382/6; 382/34
[58] Field of Search .............. 382/33, 34, 42, 6; 364/413, 463

[56] References Cited

U.S. PATENT DOCUMENTS

| | | | |
|---|---|---|---|
| 3,947,833 | 3/1976 | Eckstein, Jr. | 382/34 |
| 4,153,946 | 5/1979 | Upton | 382/34 |
| 4,244,029 | 1/1981 | Hogan et al. | 382/34 |
| 4,288,782 | 9/1981 | Bader et al. | 382/34 |
| 4,293,912 | 10/1981 | Walters | 382/42 |

Primary Examiner—Leo H. Boudreau
Assistant Examiner—Joseph Mancuso
Attorney, Agent, or Firm—Guido Modiano; Albert Josif

[57] ABSTRACT

A modularly expansible system is disclosed for real time processing of a TV image or display, the system being particularly useful for the acquisition of coordinates of known shape objects, or objects with any shape and spatial lay, incorporating a correlation means which comprises a plurality of cascade connected stages, among which a stage adapted to parallelize a preset number of TV raster lines, at least one column delay line stage, at least one pre-adder stage, and a totalizing adder stage. The inventive system may be readily expanded by interconnecting substantially alike modules, to thus find useful industrial scale application in a range of different fields, from the medical field to robotics. It may also be easily implemented at different levels of sophisticated design to practically meet any needs for real time in-line acquisition of known shape object coordinates.

2 Claims, 11 Drawing Figures

MODULARLY EXPANSIBLE SYSTEM FOR REAL TIME PROCESSING OF A TV DISPLAY, USEFUL IN PARTICULAR FOR THE ACQUISITION OF COORDINATES OF KNOWN SHAPE OBJECTS

BACKGROUND OF THE INVENTION

This invention relates to a modularly expansible system for real time processing of a TV image or display, useful in particular for the acquisition of the coordinates of known shape objects or merely contrasting objects with the background, the terms "object" or "target" referring herein to targets of limited known size present in a TV field.

A currently much felt problem is, in several fields, from the biomedical one to industry, that of assessing with the utmost possible degree of accuracy, the coordinates or either moving or stationary objects, in order to exactly locate the position of the objects or plot a "pattern of movement" thereof.

SUMMARY OF THE INVENTION

Accordingly, the task of this invention to provide a system as indicated which can afford direct in-line acquisition of the coordinates of known shape objects or targets by simple bi-dimensional correlation techniques.

Within that task it is an object of this invention to provide a system as indicated, which can detect with great accuracy both motionless target coordinates and temporarily variable coordinates of moving targets, thus affording an extremely accurate representation of the pattern of movement of the latter.

It is a further object of the invention to provide a system as indicated, which has a high resolution, and wherein detection errors can be effectively minimized.

Yet another object of the invention is to provide a system as indicated, which can operate both with passive markers and semi-active markers, e.g. catadioptric markers.

Yet another object of this invention is to provide a system as indicated, which is functionally highly effective, and adapted to be readily expanded to find application in such recently developed industrial fields as robotics, while being suited to implementation at various levels of design sophistication, thereby meeting virtually any requirements involving real time in-line acquisition of objects having any shapes.

In a preferred embodiment of this invention, the correlation means forming the core of the coordinate recognition system is implemented by a plurality of cascade connected stages. At least one of such stages is arranged to parallelize the lines or rows, and comprises plural delay lines whose length corresponds to a preset number of points or spots.

Advantageously, the delay lines are implemented by pairs of RAM (Random Access Memory) memories, respectively, where the contents respectively of a preceding row and current row are read out and written, thereby said lines have programmable length according to the row clock pulse rate, all the delay lines being controlled by a common control unit.

At least another of the cited correlation devices comprises column delay lines and cooperates with at least one respective pre-adder stage and multiplier stages.

Finally, the last of the correlation devices includes totalizing adders receiving the outputs from the other stages at their inputs and outputting the desired correlation function.

Advantageously, according to the invention, with applications involving larger size masks, the system can be readily expanded by simply cascade connecting alike modules or systems together as explained hereinafter, the number of the modules being selected to match the number of lines or rows in the TV raster, and the number of multipliers provided in the modules matching the number of columns in the mask.

According to one aspect of the invention, the above task and objects, which will be apparent from the ensuing description, are achieved by a TV image or display real time processing system, particularly for in-line acquisition of coordinates of objects or targets by bi-dimensional correlation techniques, characterized in that it comprises in combination and operatively interconnected circuit-wise, (a) a TV camera means adapted for scanning a field where at least one object or marker whose coordinates are to be detected is present;

(b) a means of sampling the display recorded by said TV camera means;

(c) a clock generator means adapted to synchronize at least said TV camera means and to generate the coordinates and timing for said system;

(d) an analog-to-digital converter means adapted to convert information from said TV camera means into a digital signal having preset characteristics;

(e) a correlation means receiving as the input thereto said digital signal to output a function of correlation of said input signal to a settable reference;

(f) a reference weighing means circuit-wise connected to said correlating means and cooperating therewith to supply said correlation function (mask);

(g) a detector means connected to the output from said correlation means and adapted to detect that a preset threshold has been exceeded in the correlation function and thus pick up the spots of more likely presence of said at least one object or marker; and (h) a minicomputer means for further processing said correlation function.

BRIEF DESCRIPTION OF THE DRAWINGS

Further features and advantages of the system according to the invention are pointed out in the dependent claims and may be appreciated from the following detailed description of some embodiments thereof, with reference to the accompanying drawings, where:

DESCRIPTION OF THE PREFERRED EMBODIMENTS

Figure 1:
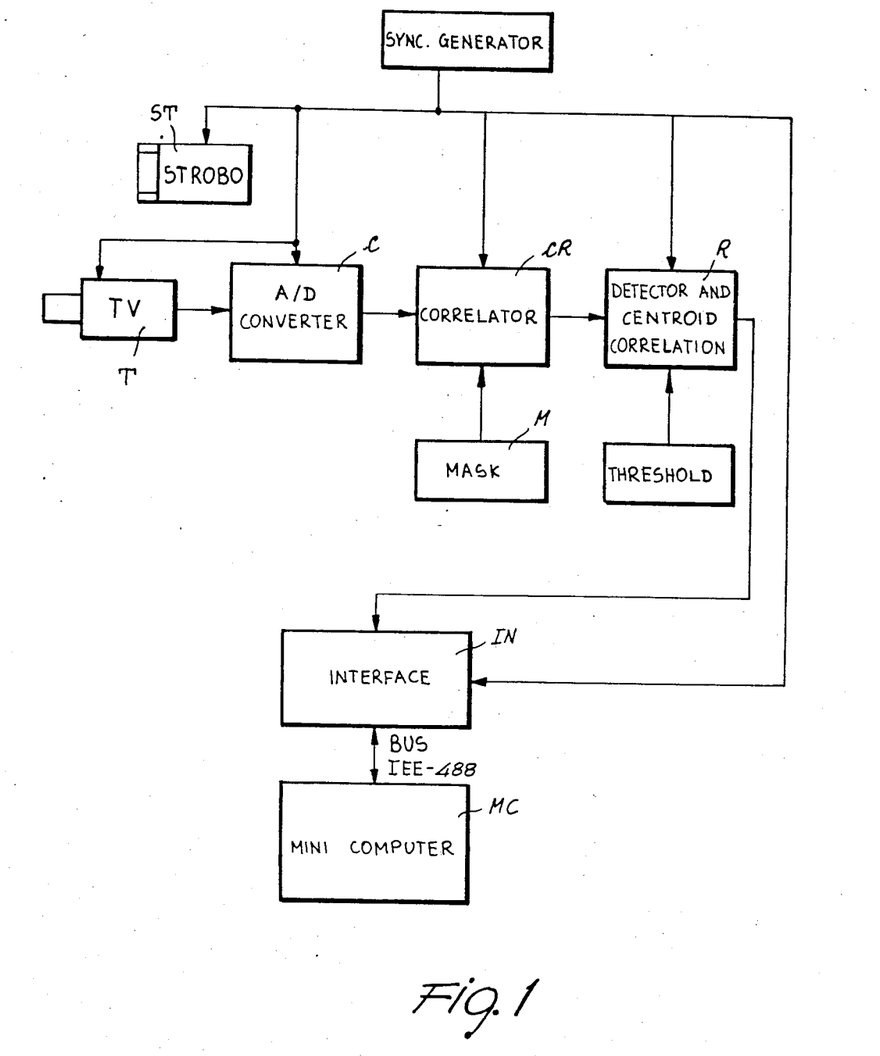
FIG. 1 is a general block diagram of a TV image or display real time processing system according to the invention.

Making more specific reference to FIG. 1, this TV image or display processing system, for real time acquisition of target or marker coordinates with bi-dimensional correlation techniques, comprises essentially a TV camera T, e.g. of the low maintenance CRT tube type, operatively connected as shown. Associated with the TV camera T is a stroboscope ST for display sampling, which in the alternative, may be replaced with a TV camera shutter. The TV camera output is supplied to an analog-to-digital converter C provided for converting the information from the TV camera into a suitable digital signal for processing in the correlator CR, according to the invention. If desired, the TV camera may be of the CCD type.

In particular, the correlator CR has the function of operating a conversion on the input signal such as to output a function of correlation between the input and a settable reference. This settable reference should have a high correlation to the marker and supply low values to the undesired background.

In order to perform the correlation operation on the TV signal, one must have available a certain number of the image or display points or spots in parallel, and this according to the invention is accomplished with a series $D_2$ of "long" delay lines for one row and series $D_1$ of "short" lines from one spot. The field thus individuated is then "weighed" by the reference mask block M of $D_1 \times D_2$ size to provide then the correlation to be supplied to the detector R.

In particular, a digital dedicated processor has been employed as correlator CR which can compute in line the correlation between portions of the display recorded by the TV camera T and the expected signal (marker) and provide the coordinates of the spots whereat the correlation takes a higher value than a preset threshold.

The output from the correlator CR is supplied to the detector R, which is adapted to detect that a threshold has been exceeded in the correlation function, so as to pick up the spots of most likely presence of the marker.

The system of this invention further includes a minicomputer MC for "intelligent" processing of the coordinates supplied to the correlator or digital processor CR.

Of course, the system resolution will depend on the type of TV camera being used and on the construction of the correlator or digital processor CR and on a suitable calculation algorithm as it will be discussed thereinafter. A trial prototype gave a resolution of one spot out of 312 in the visible field (1/256th of the useful field) along the vertical and of one spot out of 320 (1/256th of the useful field) along the horizontal, at 50 Hz. With both vertical and horizontal interlacing it has been possible to double the resolution for sampled displays at 25 Hz.

As may be seen, between the detector R and minicomputer MC, an interface IN is provided which has the function of an interpreter between the machine and minicomputer MC and that of a buffer. It may be seen that the talk takes place on a bus according to IEE-488 Standard.

It should also be born in mind that the size of the markers (not shown) detectable in the viewing field of the TV camera T will depend on the structures of the hardware and the line memories being used. In particular, an overall size ($D_1 \times D_2$) of 6×6 spots has been selected for the prototype.

A peculiar feature of this system embodiment is that it can operate with known shape targets, both with passive and semiactive markers, e.g. catadioptric markers. In the instance of known shape targets or passive markers, full use is made of the correlation computation, whereas in the instance of semi-active markers that computation is but a safety factor improving the trustworthiness of the recognition.

In a modified embodiment of the TV display processing system of this invention, the output from the correlator may be reconverted to analog by a digital-to-analog converter means (not shown) and supplied to a monitor (not shown) for reference optimization.

It should be noted that the detector in question is called upon to work on a signal which is in many ways unique.

This is, in fact, a function of three variables T (x,y,t) of which the first two are associated with the time t by two more sawtooth functions $x = f_1(t)$, $y = f_2(t)$, the latter being as a first approximation sampled (horizontal rows) $y = f_2(n_2/F_2)$.

A simple way of dealing with the function $T(f_1(t), f_2(n_2/F_2), t)$ consists of effecting a double sampling of the function $f_1(t)$ in time base and of the overall function T, again in time base. To obtain the sampled function $T(f_1(n_1/F_1), f_2(n_2/F_2), n_3/F_3)$, where the values for $F_1, F_2$ and $F_3$ are 5,000 kHz, 15,625 kHz, and 0.05 kHz, respectively, use may be made as mentioned of either a stroboscope or fast shutter with display acquisition times in the order of about ten microseconds.

Thus, the display image will be fixed within a time $t = n_3/F_3$ on the sensitive element of the TV camera and the electronic pencil will not read the information as excess charges and destroy (excepting for the persistence phenomenon, which is, however, quite limited with the tube employed). It is apparent that a function like this poses no serious problems, such as objects which alter their shape or dissipate their energy if in fast motion (streamers, stroking).

The signal becomes then a sample sequence in a two-dimension space only, as follows:

$$T(\cdot) = T(x(n_1/F_1), y(n_2/F_2), n_3/F_3) \quad (0.1.1.)$$

$$n_1 = 1, 2, \ldots, 256$$

$$n_2 = 1, 2, \ldots, 256$$

-continued $n_3 = 0, 1, \ldots S$ = highest sample number dependent on recording length $$F_1 = 5 \text{ MHz} \tag{I.1.1}$$

$$F_2 = 15{,}625 \text{ Hz}$$

$$F_3 = 50 \text{ Hz}$$

Since a single sample in the sequence $T(n_3/F_3)$ will be considered hereinafter, and the sampling rates are known, it make sense to rewrite 0.1.1, as $$T(x,y) = T(n_1, n_2) \tag{I.1.2}$$

The marker may be recognized by a suitable device which should be adapted to output a signal which can be detected. The broadest implementation of that device may be viewed either as a digital filter or as a correlator.

Figure 2:
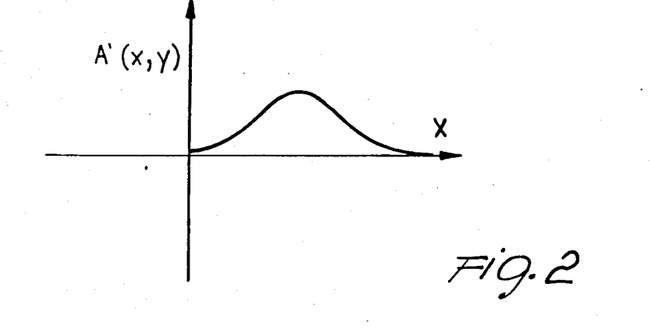
FIGS. 2 and 3 show diagrammatically the procedure followed in one embodiment of the invention for the in-line determination of the coordinates of a known shape object using the inventive system.
Figure 3:
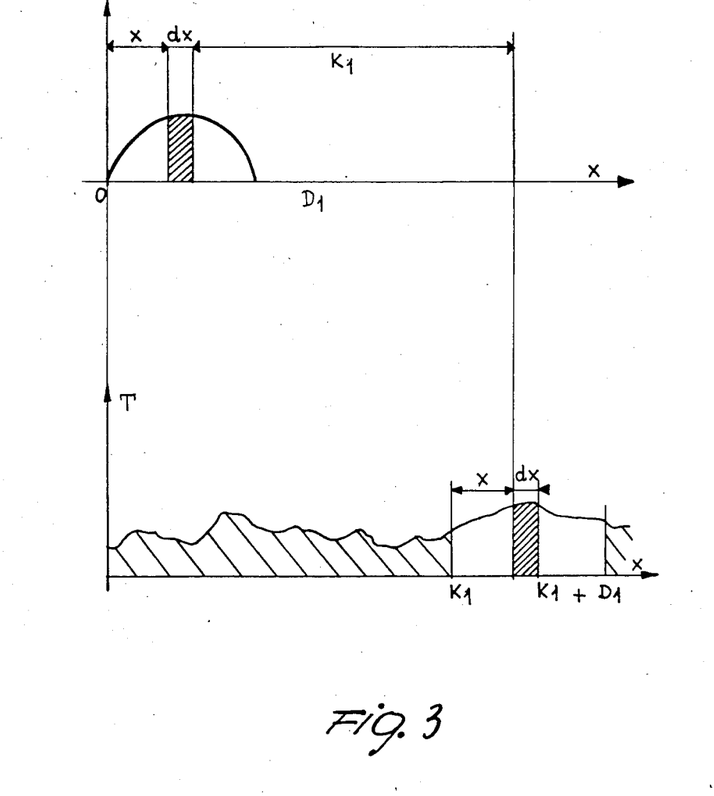
Figures 4, 5, 6:
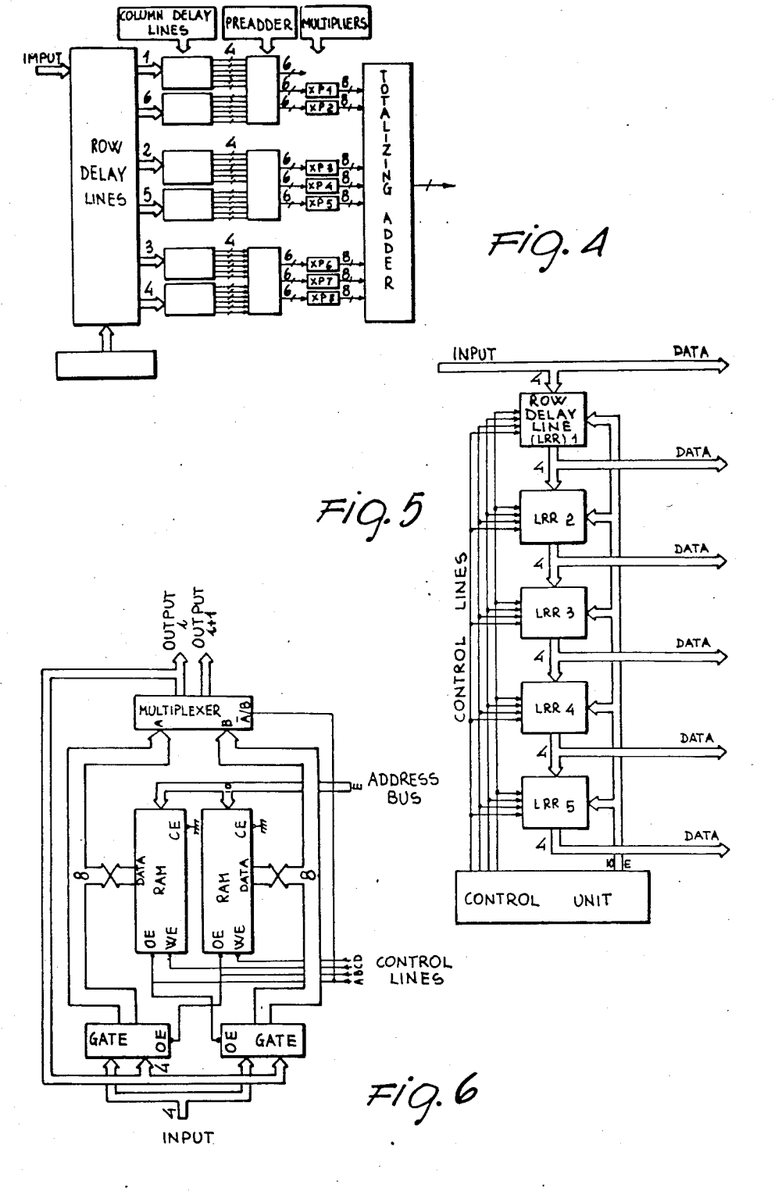
FIG. 4 is a general block diagram of the correlator stages incorporated to a preferred embodiment of this invention.
FIG. 5 is a general wiring diagram of delay lines incorporated to a stage of the correlator shown in FIG. 4.
FIG. 6 is one possible diagram of an individual line from the delay lines of FIG. 5.

For an understanding of the inventive aspect of the correlation, reference may be had to FIGS. 2–4 and the following definitions:

$A(x,y)$ = shape to be detected (useful signal) (3)
$\overline{A}(x,y)$ = multiplying function which may be selected as a duplicate of the shape to be recognized therefrom a constant is subtracted in such a way that the average value is $\leq 0$
$T(x,y)$ = totalized signal received
$N(x,y)$ = Gaussian noise
$F(x,y)$ = background signal therefore, for the signal in question, we obtain:

$$T(x,y) = A(x,y) + F(x,y) + N(x,y) \tag{4}$$

Carrying out the cross correlation between the received signal and multiplying function, $$R_{\overline{A},T}(k_1,k_2) = \iint_{-\infty}^{+\infty} \overline{A}(x,y)T((x+k_1),(y+k_2))dxdy \tag{5}$$

By applying (4), the following integral is obtained:

$$R_{\overline{A},T}(k_1,k_2) = \iint_{-\infty}^{+\infty} (\overline{A}(x,y)(A((x+k_1),(y+k_2)) + \tag{6}$$

$$F((x+k_1),(y+k_2)) + N((x+k_1),(y+k_2))))dxdy$$

Splitting $R_{\overline{A},T}$ into three integrals, (7) hereunder is obtained:

$$R_{\overline{A},T}(k_1,k_2) = \iint_{-\infty}^{+\infty} \overline{A}(x,y)A((x+k_1),(y-k_2))dxdy + \tag{7}$$

$$\iint_{-\infty}^{+\infty} \overline{A}(x,y)F((x+k_1),(y+k_2))dxdy +$$

$$\iint_{-\infty}^{+\infty} \overline{A}(x,y)N((x+k_1),(y+k_2))dxdy$$

To then readily find that, $$R_{\overline{A},T}(k_1,k_2) = R_{\overline{A},A}(k_1,k_2) + R_{\overline{A},F}(k_1,k_2) + R_{\overline{A},N}(k_1,k_2) \tag{8}$$

The objective to be pursued in order to achieve a marked improvement in the signal/noise ratio is that $R_{\overline{A},A}$ should be much greater than $R_{\overline{A},F}$ and $R_{\overline{A},N}$.

As an example, the shape of the detected target $A'(x,y)$ shown in section along the x axis in FIG. 2 will be assumed.

For convenience of construction, the function will be considered only where it is appreciably different from zero; to this aim, $A(x,y)$ will be taken as the product of $A'(x,y)$ by a suitable clipping window $W(x,y)$, (11).

$$A(x,y) = A'(x,y) W(x,y) \tag{9}$$

$$W(x,y) = 1 \quad 0 \leq x \leq D_1 \text{ and } 0 \leq y \leq D_2 \tag{10}$$

$$W(x,y) = 0 \text{ elsewhere} \tag{11}$$

Thus, the first of the integrals (7) is modified as follows:

$$R_{\overline{A},A}(k_1,k_2) = \int_0^{D_1} dx \int_0^{D_2} dy \overline{A}(x,y)A((x+k_1),(y+k_2)) \tag{12}$$

For evident implementation reasons, it appears reasonable (and in the hypothesis of a limited size marker even necessary) to also clip the function $\overline{A}$.

Thus, (13) hereunder is obtained:

$$R_{\overline{A},T}(k_1,k_2) = \tag{13}$$

$$\int_0^{D_1} dx \int_0^{D_2} dy \overline{A}(x,y)W'(x,y)T((x+k_1),(y+k_2))$$

where $W'$ is a suitable clipping window selected for convenience of the same size as $W$.

It becomes necessary, at this point, to seek the link existing between the cross correlation function and the coordinates of the spots whereat maxima of it occur, to then associate accurate coordinates with the targets.

The quickest way of obtaining that relation is the graphical method, shown in FIGS. 3 and 4, and requiring no further explanation.

Calling $\overline{x}$ and $\overline{y}$ the coordinates of the target center, it may be seen that, $$\overline{x} = k_1 + D_1/2 \quad \overline{y} = k_2 + D_2/2 \tag{14}$$

Up to now, supposedly continuous functions have been taken into consideration, but digital implementation requires sampling.

With sampling, we obtain, $$\hat{R}_{\overline{A},\hat{T}}(k_1,k_2) = \sum_0^{D_1} n_1 \sum_0^{D_2} n_2(\hat{\overline{A}}(n_1,n_2)\hat{T}((n_1+k_1),(n_2+k_2)) \tag{15}$$

which represents the final formula (less quantization) proposed as the recognition algorithm.

Making now reference to FIGS. 4 to 8, shown therein are diagrams of a further preferred embodiment of the correlation devices comprising the inventive system, while for the interconnection of such correlation devices to other system components, reference will be made to the already discussed FIGS. 1 to 3.

More precisely, the structure of that correlator embodiment appears in block diagram form in FIG. 4, and as may be seen, includes five cascade connected stages.

The first stage, which serves the function of parallelizing a certain number of TV raster rows, comprises in that embodiment 5 delay lines having, for example, a length of 320 spots and being "serpentine" connected as shown best in FIG. 5.

In the diagram of FIG. 5, the 5 delay lines proper and a control unit therefor may be seen. In particular, the need for a common control unit comes from the structure of the single delay line shown in FIG. 6. Such lines have been implemented, in fact, through the use of a pair of random access memories or RAM's, wherein the contents are alternately read out and written of the preceding row and current row, respectively. This particular implementation makes these rows "length programmable" according to the row clock pulse rate.

Figure 7:
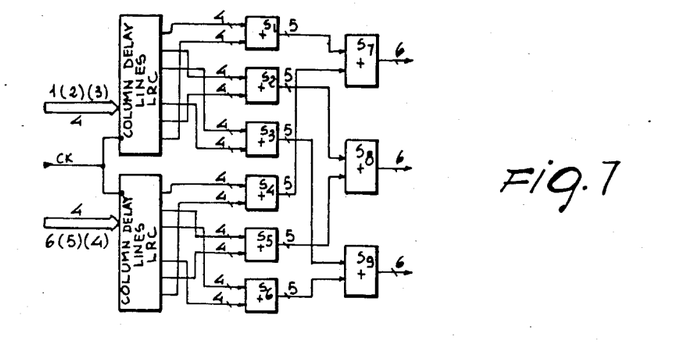
FIG. 7 is a further block diagram illustrating another stage in the correlator of FIG. 4, and more specifically the column delay lines thereof.

The second correlator stage comprises the column delay lines whose diagrams are shown in FIG. 7. It should be noted that that FIGURE actually shows the association of one pair of delay lines plus a pre-adder. The latter arrangement for the objects of that embodiment stems directly from some relations introduced between multipliers which have the dual purpose of simplifying the system and linearizing the phase of the correlator frequency response (symmetry of the coefficients). More precisely, such relations are listed hereunder:

$$A_{11} = A_{16} = A_{61} = A_{66} = \emptyset$$

$$A_{12} = A_{15} = A_{62} = A_{65}$$

$$A_{13} = A_{14} = A_{63} = A_{64}$$

$$A_{21} = A_{26} = A_{51} = A_{56}$$

$$A_{22} = A_{25} = A_{52} = A_{55}$$

$$A_{23} = A_{24} = A_{53} = A_{54}$$

$$A_{31} = A_{36} = A_{41} = A_{46}$$

$$A_{32} = A_{35} = A_{42} = A_{45}$$

$$A_{33} = A_{34} = A_{43} = A_{44}$$

It should be further noted that the aforesaid pre-adders form a third stage of the correlator of this invention. The fourth stage consists of the cited multipliers which carry out multiplication of the pre-adder outputs by the weight function which defines the reference shape.

Figure 8:
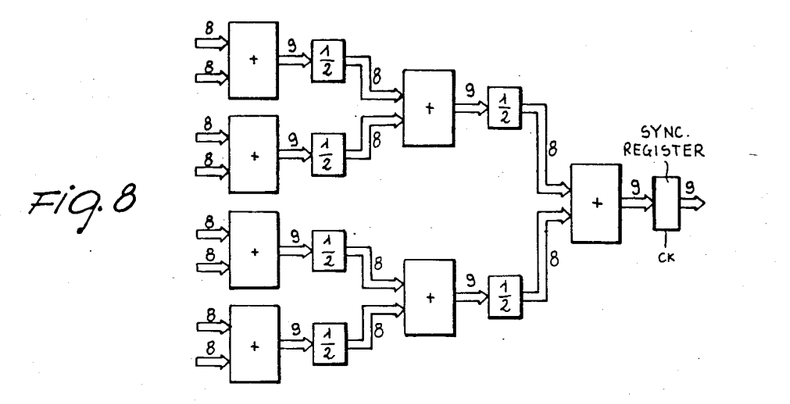
FIG. 8 is a block diagram of a final stage, or totalizing adder stage, of the correlator of FIG. 4.

The fifth and final stage of that correlator, the block diagram whereof is shown in FIG. 8, represents the so-called totalizing adder, at the output whereof the correlation function appears as computed $$R(x,y) = T(x+i, y+j) \overline{A}(i,j)$$

As mentioned, for the specific interconnection of the correlator according to the embodiment in question, and for the functions of the other processor parts, reference may be had to the above description.

Figure 9:
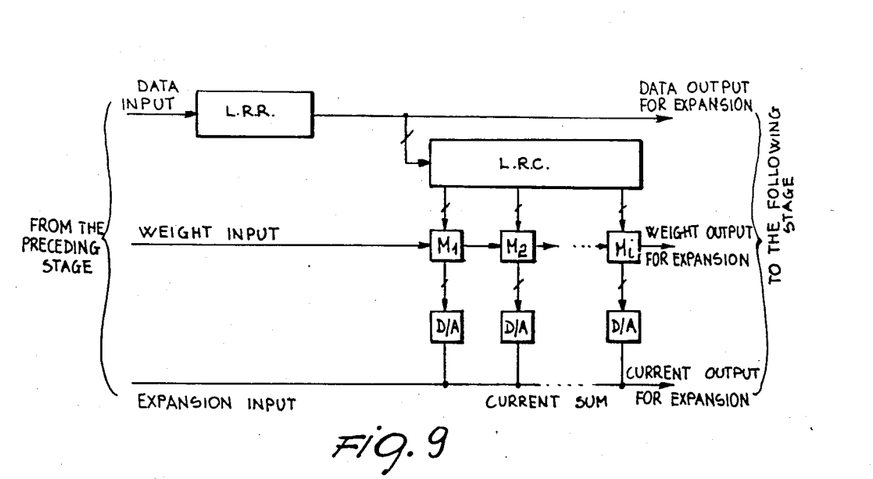
FIG. 9 shows one possible diagram for a module to be cascade interconnected with substantially alike modules in order to expand the system of FIG. 4.

The skilled person will recognize that an important advantage of the present invention resides in the readily expansible correlation system itself. In particular, with an application requiring a larger size mask, the system can be easily expanded, for example, by means of a cascade of systems or modules, one type whereof is shown in FIG. 9. In that Figure, the reference characters L.R.R. designate a row delay line, the characters L.R.C. designate a column delay line, and the characters $M_1, M_2, \ldots M_i$ designate multipliers, while D/A designate digital-to-analog converters. As mentioned, by cascade connecting a plurality of systems of the type of that shown in FIG. 9, the correlator can be easily expanded. More specifically, the number of systems or "modules" will match, as the skilled one may recognize, the row number, and the multiplier number will match the number of columns in the mask. The weight values are entered in the serial mode, e.g. by a dedicated control microprocessor.

Figure 10:
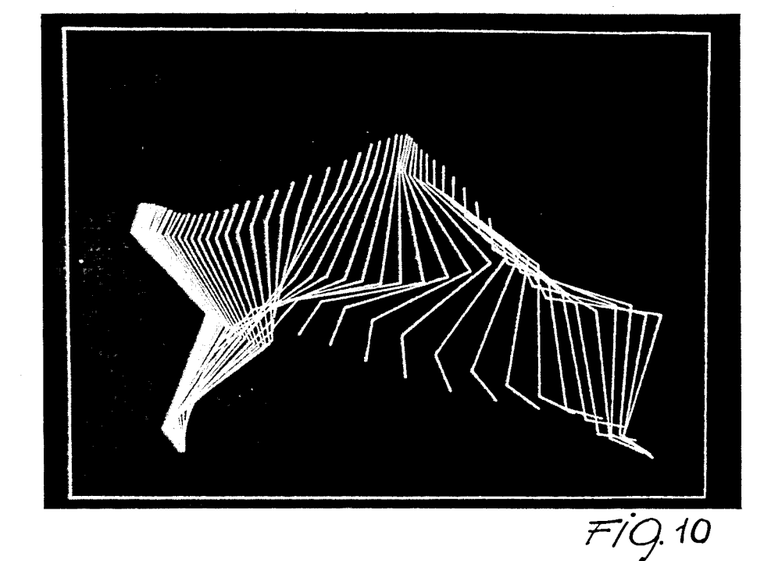
FIG. 10 shows a movement graph, in particular for a long jumping athlete, as plotted with the inventive system as operatively linked to a universal computer which processes the output information to record the movement on a plotter.

With reference to FIG. 10, shown therein, to demonstrate the value of the inventive system, is a movement diagram or record, in particular for a long jump by an athlete carrying passive markers of known form at the reference points: iliac crest, greater trochanter, knee, malleolus, and metatarsus. Quite apparent from that reproduction is the recognition effectiveness of the inventive system, the resolution whereof could be further improved considering a weighed barycenter algorithm, taking the correlation function as the weight, and considering the barycenter of the pixels for which the threshold has been exceeded.

Thus, a real time operating system has been provided capable of recognizing and identifying in standard lighting conditions moving object of known shape. The recognition and identification time is 20 milliseconds. Of these, about 13 ms are taken by display processing, which requires the effectuation of 1,300,000 operations (sum and products).

Figure 11:
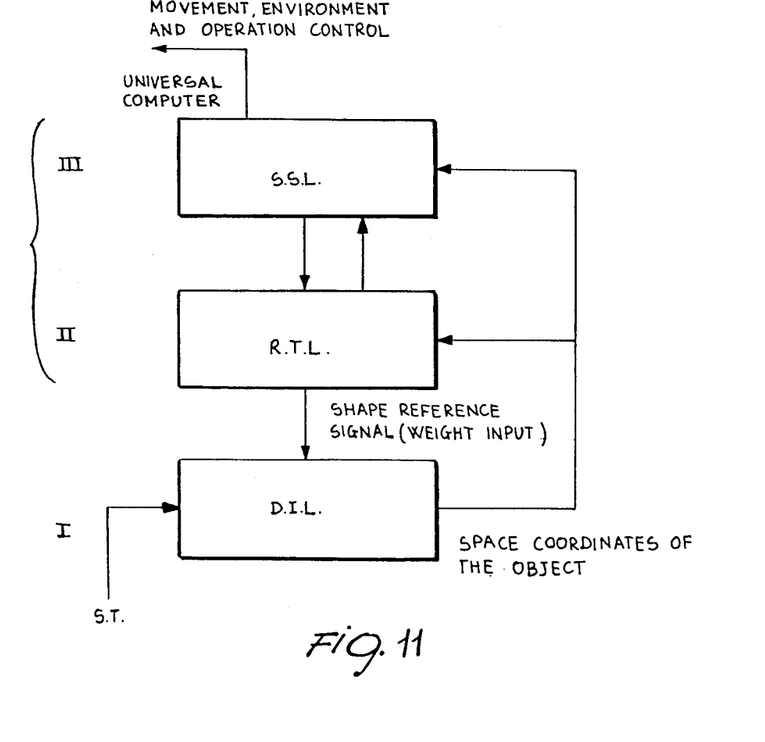
FIG. 11 is a general block diagram of a three-level hierarchical structure, wherein the system embodiment of FIGS. 1-3 forms the first level, for recognizing and quantifying the movements of objects having whatever shape and spatial lay.

Thanks to the very small values of the recognition and identification time, the system is capable, and this forms a part of this invention, of being expanded in conformity with a hierarchical structure with three levels, of which the system described in the cited patent application forms the first level. One possible block diagram of such a hierarchical structure has been shown in FIG. 11. With reference to that Figure, the three-level hierarchical structure has been configured as follows:

(I) Direct Implementation Level-DIL (II) Recognition Tactics Level-RTL (III) Self-Learning and Strategic Level-SSL Level (I) has been fully implemented via HW with high speed components, with an innovative pipelined architecture which, in perspective, may be formed with dedicated chips as mentioned above.

Levels (II) and (III) may be implemented on a General Purpose Computer or dedicated $\mu p$.

Level (I) operates in real time on an input signal from a standard or solid state TV camera and carries out the identification of the object on the basis of weight parameters and factors provided by level (II).

Level (II) has for its input the final outputs from the processing cycle from (I) (5 to 20 ms) and establishes the recognition tactics by supplying level (I) with the necessary parameters. Cycle of level (II) 5 to about 500 ms.

Level (III) deals with the general strategies and specific self-learning techniques in the different operating situations, including sensor adaptation operations (stop, focussing, etc.) operations and changes in display resolution through pixel merging and splitting.

The system, as implemented at 3 levels, can recognize/identify a plurality of objects of varying shapes, spatial orientations, of changing shape, and in motion. The recognition time is in the 5 to 20 ms range using special TV cameras in the instance of preset known shapes, 200 to 500 ms range during the initial phases of recognition of changing and/or non-univocally preset shape objects. The average recognition time in the instance of object shadowing is of about 20 ms, all the values indicated being extremely small and far lower than those of conventional recognition systems. The system accuracy has been, for the prototype made, of 0.3%, and it is anticipated that, by using special devices already available commercially, that accuracy may be raised to 0.008%.

The recognition reliability is high for the bidimensional correlation techniques employed, and may be improved at will with recoursive and self-learning processes.

It may be appreciated from the foregoing that the invention achieves its objects.

While the invention has been described with reference to specific embodiments thereof, it is susceptible to many modifications and variations without departing from the scope of the instant inventive concept. As an example, it will be apparent for the skilled one that the system may be implemented with more than three levels for recognition, at any desired degree of reliability, of the coordinates and shapes of objects having contours and occupying positions of a most varied sort, e.g. pieces on an assembly line, thus opening new prospects for interesting applications in the fields of industrial automation and robotics.

Finally, the suitability of the system as a valuable aid to the medical, radiographic, and dental fields, where the need is greatly felt for taking repeated radiographies of a patient in the same posture conditions is indicated; in such an application, for radiographies following the first, it will be enough to store, at dedicated memory devices, the marker position applied by the doctor in carrying out the first radiography, and take the following radiographies with the absolute certainty of exactly regaining the patient's original orientation, with great and obvious advantages. Another application may concern radio-therapy, to control the apparatus such as to facilitate and quantitatively control the change in position or repositioning of patients in picking up displays and/or radiation therapies, e.g. with the following procedure:

(1) Location of one or two TV cameras (in the 3D case) rigidly with the radiographic apparatus.

(2) Location at the reference points or spots on the patient of markers (e.g., self-sticking paper rods having a preset diameter).

(3) Automatic detection by the inventive system, through real time and time-share processing of the TV signal, of the spatial coordinates of said markers, storing thereof in digital form, once the optimum position of the patient has been located; and For positioning for subsequent radiographic investigation:

(4) Repositioning or retention of the markers at the same reference spots on the patient.

(5) Recovering on monitors of circles (Targets) which identify the optimum position already recorded in 3), simultaneously with representation by means of light spots of the current position of the markers.

(6) Positioning of the patient until all the current markers have overlapped on the monitor the previously mentioned Targets.

This operation is made easier by that the current markers are detected and represented on the monitor in real time (50 Hz).

(7) At the same time, during positioning, computed in real time is a suitable merit figure (CM) to quantify deviation of the positions (e.g., VQM or average squared value).

As the value of CM drops below the preset threshold, the OK to the operation is warned optically or acoustically (or the plate may be shot automatically).

(8) For detections or radiations of long duration continuous CM computing allows monitoring of any patient's movements and if CM exceeds the threashold, warning of the occurrence and/or automatic interruption of the operation.

(9) The operation provided for under (8) allows inter alia the medical personnel to operate from a safe distance.

It may be appreciated that for radiation therapy cycles, additionally to initial positioning, real time monitoring of the patient's instantaneous position, in combination with appropriate mathematic models, enables tracking of the region to be radiated, e.g. tumoral tissues, continuously and in a most accurate way.

We claim:

1. A television image real-time processing system for in-line acquisition of the coordinates of a plurality of moving objects of predetermined shape, said system comprising in combination and operatively interconnected circuit-wise:

(a) television camera means adapted for scanning a field wherein at least one said object whose coordinates are to be acquired is present;

(b) means for sampling the image recorded by said television camera means;

(c) clock generator means adapted to synchronize operation of said television camera means, to generate timing for the system and to generate coordinate signals defining selected portion of the television image;

(d) analog-to-digital converter means adapted to sequentially convert information from a selected shifting portion of the sampled image into a digital signal, said shifting portion being selected in response to said coordinate signals from said clock generator means and comprising the intersection of a predetermined small number of columns with a predetermined small number of rows of the raster of the television image;

(e) settable reference generating means to generate a digital reference weighing signal representative of a said object;

(f) correlation means connected to said converter and to said reference generating means to receive and correlate the digital signal from the converter and the digital reference weighing signal from the reference generating means and to supply a correlation signal whose magnitude is indicative of the degree of said correlation;

(g) detector means connected to said correlation means to receive said correlation signal and to detect whether the magnitude of the correlation signal exceeds a preset threshold value thereby to indicate that the presently selected said portion of the sampled image likely represents the present coordinates of a said object in said field; and (h) minicomputer means connected to said detector for further processing said correlation signals to effect said indication of said coordinates, wherein said correlation means comprises a plurality of cascade connected stages, said stages including:

a first stage comprising row delay lines equal in number to said predetermined small number of rows;

a second stage comprising column delay lines equal in number to said predetermined small number of columns;

a third stage comprising pre-adders;

a fourth stage comprising multipliers connected to receive also said digital reference weighing signals from said reference generating means; and a fifth stage comprising a totalizing adder stage to provide said correlation signal.

2. A television image real-time processing system according to claim 1 wherein said first to fifth cascade connected stages are constructed in the form of a module, and wherein said system includes a plurality of said modules connected to one another and equal in number to said small number of rows in said raster.

* * * * *